Nov. 10, 1942.    C. SUTTON    2,301,591
CYLINDRICAL SLIDE RULE
Original Filed Feb. 15, 1937    2 Sheets-Sheet 1

Coleman Sutton
INVENTOR
BY Victor J. Evans & Co.
ATTORNEYS

Nov. 10, 1942.     C. SUTTON     2,301,591
CYLINDRICAL SLIDE RULE
Original Filed Feb. 15, 1937    2 Sheets-Sheet 2

Coleman Sutton
INVENTOR

BY Victor J. Evans & Co.
ATTORNEYS

Patented Nov. 10, 1942

2,301,591

UNITED STATES PATENT OFFICE 2,301,591

CYLINDRICAL SLIDE RULE

Coleman Sutton, Alhambra, Calif.

Application February 15, 1937, Serial No. 125,875
Renewed November 5, 1938

22 Claims. (Cl. 235—79.5)

Prior to the development of modern keyboard types of computing machines, the trend of development in various types of slide rules was toward the attainment of greater and greater mathematical accuracy, wherein the speed of operation of the devices produced was considered to be of secondary importance.

In order to attain greater mathematical accuracy in a slide rule, it is necessary to lengthen the logarithmic scales thereon, and since extremely long scales are cumbersome to operate, various arrangements were devised to accommodate long scales in relatively shorter spaces. For example, a long scale may be divided into several parts, and these parts arranged in parallel formation with other coacting scales between them; or the long scales may be arranged spirally around a cylinder; or they may be carried upon the rims of coacting wheels of relatively large diameter. In any case where long scales have been used, it is to be noted that their primary purpose has been to furnish increased mathematical accuracy, and that this can be attained only with at least some decrease in the speed with which mathematical results can be produced with the instrument.

At the present time however, if a relatively great degree of mathematical accuracy is necessary, computations are customarily made upon some modern keyboard type of computing machine, or with the aid of logarithmic tables, or otherwise than by slide rule. Slide rules of the extremely long scale variety are now very seldom used, for even extremely long scales cannot provide nearly the degree of accuracy attainable by use of certain keyboard computing devices, and such slide rules are more cumbersome and slow to operate than are these modern keyboard computing machines.

In many cases however, a relatively small degree of accuracy, such as that given by the first three or four significant figures in a result, is sufficiently close for the purpose. In such cases a relatively short slide rule will give sufficiently accurate results much more quickly than those obtainable with a keyboard type of computing machine or otherwise. Also, such relatively short slide rules are commonly used at the present time for approximate but rapid checking of calculations previously made in some other manner. And further, due to their portability, relatively short slide rules are very practical for field work; whereas it would be impractical for such work to attempt to transport a keyboard type of computing machine, or some large type of slide rule requiring a base for its support when in operation.

And so it is believed that the trend of development in modern slide rules should be primarily toward the attainment of greater speed in producing mathematical results with the instrument, while retaining only that degree of mathematical accuracy sufficient for present day needs in a slide rule.

For modern demands of accuracy, rectilinear slide rules of approximtely ten inches in length are usually found to be quite satisfactory, and where they comprise a sliding element between two fixed elements, as is customary, a wide variety of coacting scales can be arranged thereon.

Such slide rules however have certain inherent disadvantages which retard their speed of operation, among which disadvantages are:

(1) They operate by a method of "push-and-pull" which is a physically awkward procedure and which makes smooth action and rapid setting of the scales rather difficult.

(2) The sliding element is customarily supported directly by the stationary scale bearing elements, as in tongues and grooves or the like, such that the amount of friction between these elements increases as they are pushed together and decreases as they are pulled apart, thus making smooth action still more difficult.

(3) Only one hair line index is customarily provided.

(4) It is frequently necessary to transfer readings to so called folded scales where such scales are provided, or, where they are not provided, it is often necessary to reset the scales so that the result of a calculation will not lie beyond the end of the scales.

The primary purpose of this invention is to overcome these disadvantages in rectilinear slide rules while retaining their advantages; and a further purpose is to provide additional advantages which combine with the whole to afford greater speed of operation and greater durability than is customary in slide rules. To attain these and other purposes I provide my slide rule in cylindrical form, such that the circumference of the scales is approximately ten inches, or slightly more than three inches in diameter. However, nothing stated herein is to be construed as confining my device to any exact dimensions.

This invention therefore relates to cylindrical slide rules and has for an object to provide a cylindrical slide rule which operates by rotation while suspended between the hands of the operator, this object being based on the belief that it is easier to rotate the elements of such a device between the hands than it is to push a rectilinear slide rule together and pull it apart.

A further object is to provide a slide rule in which the movable scale bearing element is operatively supported independently of the fixed scale bearing elements, thereby virtually eliminating friction between these elements. This makes possible smoother action between these elements than is customary in slide rules.

A further object is to provide a cylindrical slide rule having a rotary transparent hollow cylinder covering the scales, which cylinder carries a plurality of hair line indices to facilitate reading and aligning the scales, and also carries conventional letters or insignia designating each of the several scales. Thus the desired scale to be selected at any time may be readily identified by its letter or insignia on the transparent cover; and since the nearest of the several hair lines can always be used, the operation of setting the hair line index can usually be made more quickly on my device than is customary in rectilinear slide rules.

A further object is to provide a slide rule having endless scales so that the result of a calculation never lies beyond the end of the scales, as it frequently does in rectilinear slide rules. This provision for endless scales consequently obviates the necessity for so called folded scales provided on certain types of rectilinear slide rules, and further increases the speed with which mathematical results can be obtained.

A further object is to provide a cylindrical slide rule such that the scales thereon can be arranged in practically the same combinations in which they are arranged upon rectilinear slide rules.

A further object is to provide a cylindrical slide rule such that its portability is practically equivalent to that of rectilinear slide rules.

A further object is to provide a cylindrical slide rule such that no portion of its scales is ever obscured from view by a base or any framework or housing of the instrument.

A further object is to provide a cylindrical slide rule such that no portion of its scales need be ever obscured from view by the fingers of the operator.

A further object is to provide slight but constant frictional resistance to rotation of the parts motivating the rotary scale bearing element, so that the rotary scales will remain in any set position while other parts of the instrument are being operated.

A further object is to provide compensatory adjustment for shrinkage or swelling due to atmospheric changes or otherwise which might interfere with the smoothness of operation of the rotary scale bearing element.

A further object is to provide adjustment whereby the scales on one of the two fixed scale bearing elements may be accurately aligned with those on the other fixed scale bearing element.

A further object is to provide the aforesaid transparent hollow cylinder to completely cover the scales, so that necessity for cleaning the scales is virtually eliminated, and so that the surface of the scales is protected from wear and tear, thus rendering my device more durable than is customary in cylindrical slide rules.

A further object is to provide the transparent cylinder to rotate around the scales without touching the surface of the scales, so that the scales will not be worn away or marred by rotation of the transparent cylinder.

A further object is to provide slight but constant frictional resistance to rotation of the transparent cylinder, so that the hair line indices thereon will remain in any set position while other parts of the instrument are being operated.

A further object is to provide external manual controlling elements to operate the transparent cylinder and the rotary scales at full speed.

A further object is to provide an auxiliary slow motion control knob to operate the rotary scales at reduced speed, thus facilitating accurate setting of the movable scales more quickly than is possible in rectilinear slide rules.

With the foregoing and other objects in view, the invention consists of certain novel details of construction and combinations of parts hereinafter fully described and claimed.

In the accompanying drawings forming part of this specification:

Figure 1:
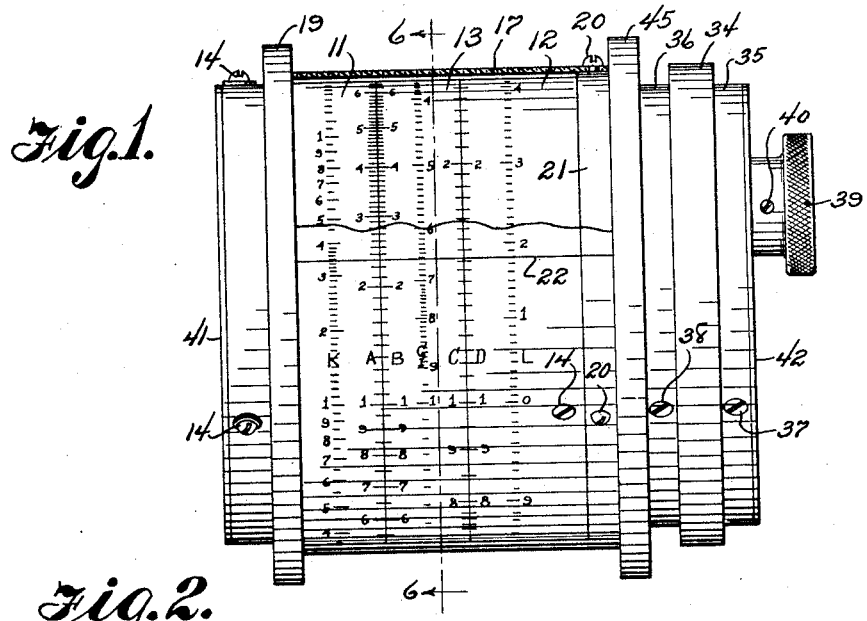
Figure 1 is a front elevation of a preferred embodiment of the cylindrical slide rule with a portion of the transparent hollow cylinder broken away.
Figure 2:
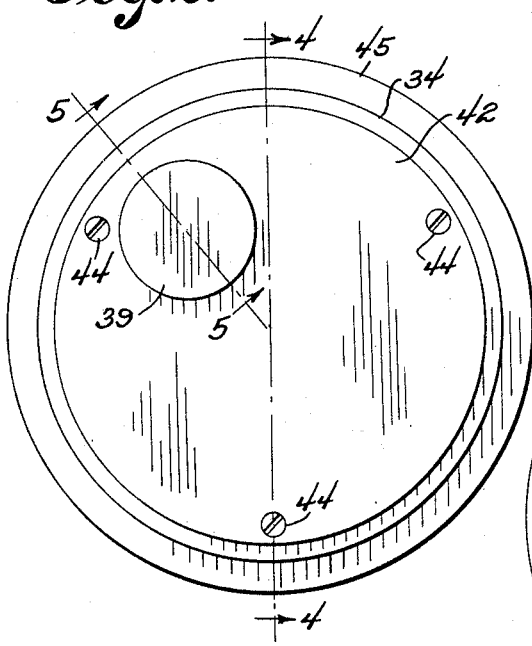
Figure 2 is an end elevation of the same embodiment of the slide rule looking at the right-hand end thereof.
Figure 3:
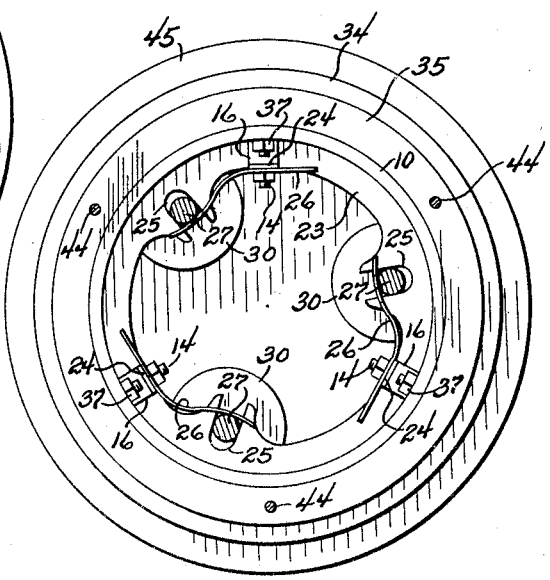
Figure 3 is a cross sectional view taken on the line 3—3 of Figure 4 showing one of the holding rings and its adjacent springs.

Referring now to the drawings in which like characters of reference designate similar parts in the various views, Figs. 1 to 6 inclusive illustrate a preferred embodiment of my invention in which 10 designates a supporting cylinder upon which are mounted two fixed scale bearing rings 11 and 12. A rotary scale bearing ring 13 is located between the two fixed rings. The stationary scale bearing ring 11 at the left-hand end of the cylindrical slide rule is adjustable longitudinally and circumferentially with relation to the cylinder 10, and for this purpose the securing bolts 14 are loosely fitted in openings 15 in the stationary ring and through spacers 16 disposed on the inner surface of the cylinder. There are preferably three of these bolts disposed 120 degrees apart. By loosening the bolts the stationary scale bearing ring 11 may be moved toward or away from the rotary scale bearing ring 13 or may be moved slightly circumferentially of the cylinder until the desired adjustment is obtained, whereupon the bolts may be retightened.

A transparent cylinder 17 surrounds the scale bearing rings, the inside diameter of the cylinder being slightly greater than the diameter of the scales. The left-hand edge portion of the cylinder is rotatively seated in a slot 18 formed in a flange 19 which projects from the fixed scale bearing ring 11; while the right-hand edge portion of the transparent cylinder is fixed by screws 20 to the peripheral edge of a ring 21 which is rotatively mounted on the aforesaid supporting cylinder 10 of the slide rule. Thus the transparent cylinder does not touch the scales, and when rotated it will not rub nor mar the scales. A flange 45 on the ring 21 facilitates rotation of the cylinder, which completely covers the scales, as shown.

The said transparent cylinder is provided with conventional letters, as shown at K, A, B, C/I, C, D, and L in Fig. 1. These letters indicate the various scales, and are located on the transparent cylinder so as to appear directly over the corresponding scales. It is to be understood however that the scales shown in Fig. 1 are for the purpose of illustration only, as any other preferred scales or combinations thereof may be used.

The transparent cylinder 17 is also provided with a plurality of hair lines 22 to facilitate aligning and reading the scales. There are preferably three of these hair lines disposed 120 degrees apart on the inner surface of the cylinder. In order that the setting of the hair line used will remain stable during operation of the rotary scales, or until it is desired to change the setting of the hair line, frictional resistance to rotation of the ring 21 supporting the transparent cylinder 17 is provided by balls 46 and compressed coil springs 47 held by screws 20 and exerting pressure against the outer surface of the supporting cylinder 10, as best shown in Fig. 4.

Figure 4:
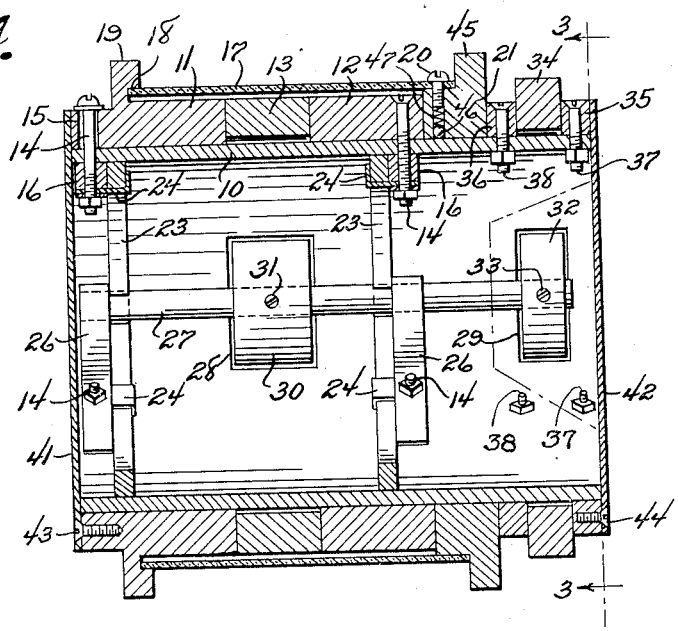
Figure 4 is a longitudinal sectional view taken on the line 4—4 of Figure 2 showing parts in elevation.
Figure 5:
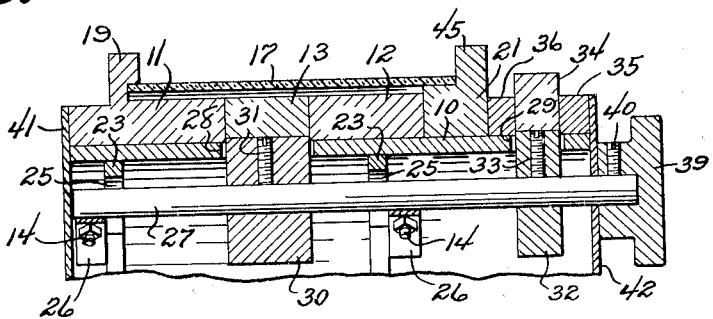
Figure 5 is a detail longitudinal sectional view taken on the line 5—5 of Figure 2 showing the slow motion knob and parts operated thereby.
Figure 6:
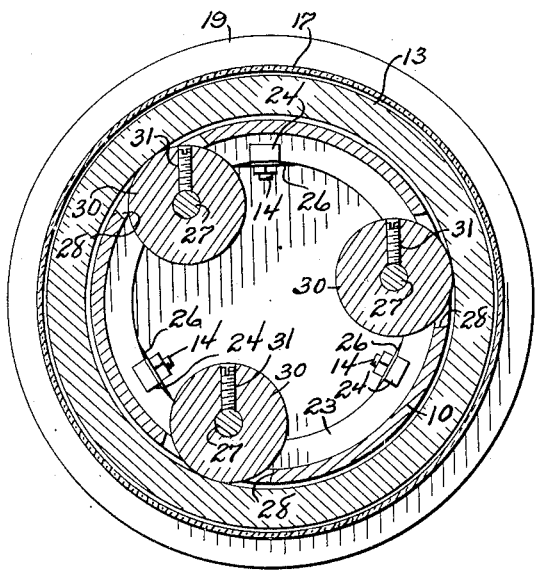
Figure 6 is a cross sectional view taken on the line 6—6 of Figure 1 showing one set of the frictional rollers for motivating the part carrying the rotary scales.

For supporting and motivating the rotary scale bearing ring 13, a plurality of shafts 27, preferably three in number as best shown in Fig. 6, are journaled in a pair of holding rings 23 which are clamped stationary to the inner surface of the supporting cylinder 10 by brackets 24 which are secured in place by the beforementioned bolts 14, as best shown in Fig. 4. The holding rings are provided with slots 25, best shown in Fig. 3, to receive the shafts 27. Leaf springs 26 are disposed across the shafts 27, adjacent to the slots 25. Said leaf springs exert outward radial pressure against the shafts and provide frictional resistance to rotation of the shafts. Said leaf springs are secured in place by the bolts 14 which are passed through the springs and through the supporting cylinder 10.

As best shown in Figs. 4 and 6 the supporting cylinder 10 is provided with pairs of spaced openings 28 and 29, the openings 28 being spaced circumferentially apart in the cylinder in a row, as are also the openings 29. Friction rollers 30 are secured to the shafts 27 by screws 31 and project through respective ones of the openings 28. Likewise friction rollers 32 are secured to the shafts 27 by screws 33, as best shown in Fig. 4, and project through the openings 29. The three rollers 30 bear against the inner periphery of the rotary scale bearing ring 13 and are under constant compression due to the leaf springs 26 which thereby provide frictional resistance to rotation of the ring 13 so that the scales thereon will remain in any set position while other parts of the instrument are being operated.

It will here be noted that the rotary scale bearing ring 13 is supported upon the three rollers 30, and that the rotary scale bearing ring is not therefore dependent for support upon the fixed scale bearing rings 11 and 12, in tongues and grooves or the like, as is customary in slide rules. Hence, in operation the rotary scale bearing ring 13, although confined between the fixed scale bearing rings 11 and 12, is driven by and supported upon the rollers 30 in such manner that friction between the rotary and the fixed scale bearing elements is virtually eliminated.

For rotating the shafts 27 a motivating ring 34 is rotatively mounted upon the rollers 32 and is confined between two stop rings 35 and 36 which are anchored stationary to the supporting cylinder 10 by respective bolts 37 and 38. The inner periphery of the motivating ring 34 frictionally engages the three rollers 32. Thus when the ring is rotated the rollers 32 impart corresponding movement to the shafts 27 which in turn rotate the rollers 30 which frictionally engage the inner periphery of the rotary scale bearing ring 13 with resultant rotation of the latter. The ring 34 provides full speed adjustment.

A slow motion adjustment is accomplished by means of a knob 39 which is secured to the end of one of the shafts 27 by a screw 40. By turning the knob carefully an accurate adjustment is obtained more rapidly than is customary in rectilinear slide rules.

The scale bearing rings 11, 12, and 13 may be rotated in unison within the transparent cylinder 17 in order to bring the scales into alignment with one of the hair lines 22, by holding the flange 45 and rotating the flange 19, in which case the ring 13 is carried in unison with the rings 11 and 12 by the friction rollers 30. The ring 13 may then be rotated relatively to the rings 11 and 12 for any required setting of its own scales on the hair line, by holding the flange 19 and rotating either the motivating ring 34 or the knob 39, in which case the ring 13 is actuated by, and rotates upon, the friction rollers 30. Thus the friction rollers 30 serve both to rotate the ring 13 in unison with, and relative to, the rings 11 and 12.

End plates 41 and 42 are secured at the ends of the supporting cylinder 10 by screws 43 and 44 respectively, as best shown in Fig. 4.

This completes the description of a preferred embodiment of my invention.

It is thought that the accompanying drawings and description of a preferred embodiment of my invention are sufficient for the purposes of this specification, it being understood that various modifications of the invention may be resorted to within the scope of the appended claims.

In mathematical operation the cylindrical slide rule works in practically the same manner as rectilinear slide rules, except that the scales on the cylindrical slide rule are read vertically instead of horizontally. Since there is therefore practically no difference from a mathematical standpoint between the operation of the cylindrical slide rule and that of a rectilinear slide rule, anyone familiar with the use of a rectilinear slide rule will encounter no difficulty in the mathematical operation of the cylindrical slide rule and will require practically no instruction therein. Hence it is believed unnecessary to describe in detail here any illustrative mathematical examples.

It has been noted that the scales on the cylindrical slide rule are endless and that the result of a calculation therefore never lies beyond the end of the scales; however, certain scales for special purposes, such that they may not need to be extended around the entire circumference of the instrument, may also be provided if desired.

In fact, this invention is not intended to be limited to use with logarithmic scales. While mathematical computations made by slide rules are customarily accomplished with logarithmic scales, special scales other than logarithmic ones may obviously be used on my device if desired for certain purposes. The term "slide rule" in the appended claims is not therefore to be construed as limiting my device to logarithmic scales.

It may be noted that in the operation of the instrument approximately one-half of the scales is always out of sight, being on the opposite side of the instrument from the eyes of the operator; whereas in rectilinear slide rules every portion of the scales is usually always visible. This fact however is of no disadvantage in reading the scales on the cylindrical slide rule because that portion of the scales to be used is always made the visible portion by rotating the scales when necessary, and the operator is not at the same time interested in the invisible portion on the opposite side of the instrument.

In mechanical operation the entire instrument may be rotated between the hands by means of the flange 19 and the ring 35; or the fixed scales may be held stationary by means of the flange 19 while one of the rotary scales is being set by means of the full speed controlling element thereof; or both the rotary scales and the fixed scales may be held stationary by means of the flange 19 while the hair line index is being set by means of the flange 45; or the hair line index may be held stationary by means of the flange 45 while all of the scales are being rotated in unison by means of the flange 19; and accurate and rapid final adjustment of the rotary scales may be facilitated by use of the auxiliary slow motion control knob, while the fixed scales are being held stationary by means of the flange 19.

Thus in the mechanical operation of the instrument the operator's left hand may grasp the flange 19 while his right hand may grasp either the flange 45, the ring 35, or the preferred element controlling the rotary scales, the instrument thereby being rendered capable of all manipulations necessary in a slide rule, and in such manner that the operator's fingers need never obscure any portion of the scales. By providing an external manual controlling element to operate the rotary scales at full speed and without obscuring any portion of the scales, my device is rendered capable of operating at greater speed than has heretofore been customary in cylindrical slide rules.

It will be noted from the foregoing description that my slide rule has no base to support it in operation, and that it requires no exterior framework or housing to hold its elements together. Thus it is not necessary for example to view the scales on my slide rule through vision windows in an exterior casing such as required in some devices. In fact, there are no exterior elements of any kind about my slide rule that could ever obscure even a portion of its scales. This contributes greatly to the speed with which the scales can be aligned in operation.

In conclusion of this description it may be noted that the left-hand end plate 41 of the cylindrical slide rule forms a base upon which the instrument may be stood on end upon a desk, table, or other support when not being used temporarily.

From the foregoing description it is thought that the construction and operation of the invention will be fully understood without further explanation.

The invention claimed is:

1. In a cylindrical slide rule including a plurality of rings bearing cooperating scales and disposed side by side upon a common axis, means disposed within said rings and upon which said rings are mounted for rotating said rings in unison, one of said rings being mounted for rotation independently of the other rings, and motivating elements forming part of said means engaging said one ring for enabling rotation thereof relative to the other rings.

2. In a cylindrical slide rule including cooperating scales disposed upon three circular elements mounted side by side upon a common axis and which consist of a rotatable scale bearing element between two relatively fixed scale bearing elements, the combination with the rotatable scale bearing element of motivating elements supporting the rotatable scale bearing element for actuating the rotatable scale bearing element.

3. A cylindrical slide rule including two relatively fixed rings laterally spaced apart on the axis of said slide rule, a rotatable ring co-axially disposed and laterally confined between said fixed rings, all of said rings bearing cooperating scales, a motivating ring rotatably mounted on the axis of said slide rule beyond one of said fixed rings, and means disposed within said slide rule connecting the motivating ring and the rotatable scale bearing ring for actuating the rotatable scale bearing ring.

4. A cylindrical slide rule including two relatively fixed rings laterally spaced apart on the axis of said slide rule, a rotatable ring co-axially disposed and laterally confined between said fixed rings, all of said rings bearing cooperating scales, a motivating ring rotatably mounted on the axis of said slide rule beyond one of said fixed rings, and means disposed within said slide rule supporting the motivating ring and the rotatable scale bearing ring for connecting these rings to actuate the rotatable scale bearing ring.

5. A cylindrical slide rule including a rotatable scale bearing element, a driving shaft encircled by the rotatable scale bearing element adapted to actuate the rotatable scale bearing element for moving the scales thereon to set positions, and a spring mounted on said slide rule in frictional contact with said shaft for resisting rotation of said shaft and thereby holding the rotatable scale bearing element in said set positions.

6. A cylindrical slide rule including a rotatable ring, a shaft eccentrically disposed within said ring, a friction roller fixed on said shaft engaging said ring, and a spring mounted within said slide rule exerting pressure on said shaft for holding the said friction roller thereon engaged with the aforesaid ring.

7. A cylindrical slide rule including a rotatable ring, a friction roller engaging the inner periphery of said ring, a driving shaft upon which said friction roller is fixed, a bearing member disposed within said slide rule having a slot therein, said slot rotatably holding said driving shaft, and a spring disposed within said slide rule in contact with said driving shaft for holding said shaft within the aforesaid slot.

8. A cylindrical slide rule including a hollow cylindrical supporting member having an opening in its arcuate surface, a rotatable scale bearing ring encircling said opening and mounted on the axis of said member, and means disposed within said member projecting through the said opening therein and engaging the said rotatable scale bearing ring for actuating said ring.

9. A cylindrical slide rule including a hollow cylindrical supporting member having an opening in its arcuate surface, a rotatable scale bearing ring encircling said opening and mounted on the axis of said member, a rotatable shaft eccentrically mounted within said member projecting longitudinally beyond one end of said member, a friction roller fixed to said shaft projecting through the aforesaid opening and engaging the inner periphery of the aforesaid rotatable scale bearing ring for actuating said ring, and a knob on the projecting end of the aforesaid shaft for turning said shaft to actuate the friction roller thereon.

10. A cylindrical slide rule including a hollow cylindrical supporting member having an opening in its arcuate surface, two fixed rings on said member, a rotatable ring encircling said opening and mounted on the axis of said member, said rotatable ring being laterally confined between and unsupported by said fixed rings, all of said rings bearing cooperating scales, and a shaft eccentrically mounted in said hollow cylindrical member geared to the said rotatable ring through the aforesaid opening for rotating said rotatable ring relative to said fixed rings.

11. A cylindrical slide rule including a hollow cylindrical supporting member having a plurality of openings in its arcuate surface, a rotatable scale bearing ring encircling said openings and mounted on the axis of said member, and means disposed within said member projecting through the aforesaid openings therein and supporting the said rotatable scale bearing ring for actuating said ring.

12. A cylindrical slide rule including a hollow cylindrical supporting member having a plurality of openings in its arcuate surface, a rotatable scale bearing ring encircling said member and mounted on the axis thereof, a motivating ring encircling said member and rotatably mounted on said axis thereof, said rings being laterally spaced apart on the axis of said member, and means disposed within said member projecting through the aforesaid openings therein and connecting the said rings for actuating the said rotatable scale bearing ring.

13. A cylindrical slide rule including a hollow cylindrical supporting member having a plurality of openings in its arcuate surface, a rotatable scale bearing ring encircling said member and mounted on the axis thereof, a motivating ring encircling said member and rotatably mounted on said axis thereof, said rings being laterally spaced apart on the axis of said member, and means disposed within said member projecting through the aforesaid openings therein and supporting the said rings for connecting said rings to actuate the said rotatable scale bearing ring.

14. A cylindrical slide rule including a hollow cylindrical supporting member having a plurality of openings in its arcuate surface, a rotatable scale bearing ring encircling said openings and mounted on the axis of said member, a motivating ring encircling said member and rotatably mounted on said axis thereof, said rings being laterally spaced apart on the axis of said member, friction rollers disposed within said member projecting through the aforesaid openings therein and supporting the rotatable scale bearing ring and for rotating the rotatable scale bearing ring, and means connecting the motivating ring and the said friction rollers for actuating said rollers.

15. A cylindrical slide rule including a hollow cylindrical supporting member having a plurality of openings in its arcuate surface, a rotatable scale bearing ring encircling said openings and mounted on the axis of said member, a motivating ring encircling said member and rotatably mounted on said axis thereof, said rings being laterally spaced apart on the axis of said member, a plurality of shafts disposed within said member extending longitudinally thereof, friction rollers on said shafts projecting through the aforesaid openings and supporting the rotatable scale bearing ring for rotating the rotatable scale bearing ring, and a driving roller fixed to one of said shafts engaging the aforesaid motivating ring for turning the shaft to actuate the friction roller thereon.

16. A cylindrical slide rule including a hollow cylindrical supporting member having a plurality of openings in its arcuate surface, a rotatable scale bearing ring encircling said member and mounted on the axis thereof, a motivating ring encircling said member and rotatably mounted on said axis thereof, said rings being laterally spaced apart on the axis of said member, a plurality of shafts disposed within said member extending longitudinally thereof, and friction rollers on the shafts projecting through the aforesaid openings and supporting the said rings for connecting these rings to actuate the said rotatable scale bearing ring.

17. A cylindrical slide rule including a hollow cylindrical supporting member having a plurality of openings in its arcuate surface, a rotatable scale bearing ring encircling said openings and mounted on the axis of said member, a plurality of shafts disposed within said member extending longitudinally thereof, friction rollers on the shafts projecting through the aforesaid openings and supporting the rotatable scale bearing ring for rotating said ring, one of said shafts projecting beyond said supporting member, and a knob on the projecting end of said shaft for turning the shaft to actuate the friction roller thereon.

18. A cylindrical slide rule including a hollow cylindrical supporting member having a plurality of openings in its arcuate surface, a rotatable scale bearing ring encircling said member and mounted on the axis thereof, a motivating ring encircling said member and rotatably mounted on said axis thereof, said rings being laterally spaced apart on the axis of said member, a pair of holding rings mounted within said member and laterally spaced apart on the axis thereof, a plurality of slots circumferentially disposed in the inner peripheries of said holding rings, shafts rotatably confined within said slots extending longitudinally within said member, friction rollers on said shafts projecting through the aforesaid openings in said member and supporting the said rotatable scale bearing ring and the motivating ring for connecting these rings to actuate the rotatable scale bearing ring, and leaf springs disposed within said member adjacent to said holding rings in frictional contact with said shafts for holding the shafts within the aforesaid slots and projecting the friction rollers on said shafts through the aforesaid openings.

19. A cylindrical slide rule including a hollow cylindrical supporting member having a plurality of openings in its arcuate surface, a rotatable scale bearing ring encircling said openings and mounted on the axis of said member, a pair of holding rings mounted within said member and laterally spaced apart on the axis thereof, a plurality of slots circumferentially disposed in the inner peripheries of said holding rings, shafts rotatably confined within said slots extending longitudinally within said member, friction rollers on said shafts projecting through the aforesaid openings in said member and supporting the said rotatable scale bearing ring for rotating said ring, one of said shafts projecting beyond said supporting member, a knob on the projecting end of said shaft for turning said shaft to actuate the friction roller thereon, and leaf springs disposed within said member adjacent to the aforesaid holding rings in frictional contact with said shafts for holding the shafts within the aforesaid slots and projecting the friction rollers on said shafts through the aforesaid openings.

20. A cylindrical slide rule including a hollow cylindrical supporting member having a plurality of openings in its arcuate surface, two fixed rings on said member, a rotatable ring mounted on the axis of said member between the fixed rings, said fixed rings laterally confining the rotatable ring, all of said rings bearing cooperating scales, a portion of said member extending beyond one of said fixed rings, a motivating ring rotatably mounted on the axis of said member and encircling the extended portion of said member, and means disposed within said member projecting through the aforesaid openings therein and connecting the said rotatable scale bearing ring and the motivating ring for actuating the rotatable scale bearing ring.

21. A cylindrical slide rule including a hollow cylindrical supporting member having a plurality of openings in its arcuate surface, two fixed rings on said member, a rotatable ring mounted on the axis of said member between the fixed rings, said fixed rings laterally confining the rotatable ring, all of said rings bearing cooperating scales, a portion of said member extending beyond one of said fixed rings, a motivating ring rotatably mounted on the axis of said member and encircling the extended portion of said member, a pair of holding rings mounted within said member and laterally spaced apart on the axis thereof, a plurality of slots circumferentially disposed in the inner peripheries of said holding rings, shafts rotatably confined within said slots extending longitudinally within said member, friction rollers on said shafts projecting through the aforesaid openings in said member and supporting the said rotatable scale bearing ring and the motivating ring for connecting these rings to actuate the rotatable scale bearing ring, and leaf springs disposed within said member adjacent to said holding rings in frictional contact with said shafts for holding the shafts within the aforesaid slots and projecting the friction rollers on said shafts through the aforesaid openings.

22. A cylindrical slide rule including a hollow cylindrical supporting member having a plurality of openings in its arcuate surface, two fixed rings on said member, a rotatable ring encircling said openings and mounted on the axis of said member between the fixed rings, said fixed rings laterally confining the rotatable ring, all of said rings bearing cooperating scales, a pair of holding rings mounted within said member and laterally spaced apart on the axis thereof, a plurality of slots circumferentially disposed in the inner peripheries of said holding rings, shafts rotatably confined within said slots extending longitudinally within said member, friction rollers on said shafts projecting through the aforesaid openings in said member and supporting the said rotatable scale bearing ring for rotating the rotatable scale bearing ring, one of said shafts projecting beyond said supporting member, a knob on the projecting end of said shaft for turning said shaft to actuate the friction roller thereon, and leaf springs disposed within said member adjacent to said holding rings in frictional contact with said shafts for holding the shafts within the aforesaid slots and projecting the friction rollers on said shafts through the aforesaid openings.

COLEMAN SUTTON.